United States Patent Office 3,497,439
Patented Feb. 24, 1970

3,497,439
STABILIZATION OF SOILS
Charles E. O'Bannon, Tempe, Ariz., assignor to Research Corporation, New York, N.Y., a nonprofit corporation of New York
No Drawing. Filed Apr. 10 1967, Ser. No. 629,413
Int. Cl. B01d 13/02
U.S. Cl. 204—180  3 Claims

ABSTRACT OF THE DISCLOSURE

Soils consisting of or containing clay are stabilized by electro-osmotically transporting into the soil an alkali metal or an alkaline earth metal ion of higher atomic number than sodium or a mixture of such ions.

---

Soils consisting of or containing clays have in the past caused considerable difficulty in the construction of highways and when occurring adjacent the foundation of buildings, bridge piers and abutments, dams and other structures due to the tendency of such soils to expand and/or to lose cohesiveness on the absorption of water. Representative of such soils are the montmorillonite clay soils known as the Chinle clay, occurring over a large area of the southwestern United States, particularly in northeastern Arizona.

It has been found that such soils can be effectively and permanently stabilized against excessive swelling by electro-osmotically transporting into the soils alkali metal or alkaline earth metal ion of higher atomic number than sodium or mixtures of such ions. An economical procedure for effecting such transport comprises introducing spaced conductive electrodes into the soil to be treated and applying a unidirectional electric field between the spaced electrodes while supplying to the soil adjacnet the positive electrode or electrodes an aqueous solution of at least one water soluble salt of an alkali metal or an alkaline earth metal of higher atomic number than sodium. Suitable salts are the halides, sulphate and acetate of potassium, and the halides and acetates of calcium and magnesium. Potassium salts, such as potassium chloride, have been found to be particularly effective and may be supplied as saturated aqueous solutions. An aqueous solution of 25% $CaCl_2$, 10% $MgCl_2$ and 5% $AlCl_3$ has also been found to be useful.

The electrodes may be made of metal or carbon. Electrodes of iron or aluminum are convenient and economical. Advantageously the anodes are perforated metal pipes into which the stabilizing salt solutions may be introduced and the cathodes are metal rods or pipes.

In an illustrative example of the principles of the invention, a row of perforated anode tubes are spaced ten feet apart along the center line of a projected highway right of way in Chinle clay soil and rows of cathode rods are similarly spaced along the lateral edges of the highway about 38 feet across. A saturated aqueous solution of calcium chloride is supplied to the anode tubes and a direct current potential of about 228 volts (1.0 volt per inch) is maintained between the anode tubes and the cathode rods for about 300 hours.

The necessary potential and time of treatment will vary with the particular soil and with the composition and concentration of the salt solution used and can readily be determined by preliminary trials in the laboratory or in the field.

I claim:
1. A method of stabilizing soils consisting of or containing clay which comprises applying a unidirectional electric potential between spaced conductive electrodes imbedded in the soil while supplying to the soil adjacent the posititve electrode an aqueous solution of at least one water soluble salt of an alkali metal or an alkaline earth metal of higher atomic number than sodium.
2. A method as defined in claim 1 wherein the water soluble salt is a potassium salt.
3. A method as defined in claim 1 wherein the water soluble salt is an alkaline earth metal salt.

References Cited
UNITED STATES PATENTS
2,831,804  4/1958  Collopy _____ 204—131

JOHN H. MACK, Primary Examiner
A. C. PRESCOTT, Assistant Examiner